(12) United States Patent
Jacobs et al.

(10) Patent No.: US 8,405,488 B1
(45) Date of Patent: Mar. 26, 2013

(54) SYSTEM AND METHOD FOR ENCODING BALLAST CONTROL SIGNALS

(75) Inventors: Henry Jacobs, Austin, TX (US); John J. Dernovsek, Madison, AL (US); James Koehler, Pflugerville, TX (US)

(73) Assignee: Universal Lighting Technologies, Inc., Madison, AL (US)

( * ) Notice: Subject to any disclaimer, the term of this patent is extended or adjusted under 35 U.S.C. 154(b) by 492 days.

(21) Appl. No.: 12/582,532

(22) Filed: Oct. 20, 2009

Related U.S. Application Data

(60) Provisional application No. 61/107,089, filed on Oct. 21, 2008.

(51) Int. Cl.
  G05B 11/01 (2006.01)
  H05B 41/16 (2006.01)
  H05B 37/02 (2006.01)

(52) U.S. Cl. ............... 340/12.34; 340/12.32; 340/12.35; 340/12.4; 315/224; 315/247

(58) Field of Classification Search ............... 340/12.34, 340/12.32, 12.35, 12.4; 315/307, 308, 224, 315/291, 247
  See application file for complete search history.

(56) References Cited

U.S. PATENT DOCUMENTS

| | | | |
|---|---|---|---|
| 5,471,119 A | 11/1995 | Ranganath et al. | |
| 5,668,446 A | 9/1997 | Baker | |
| 5,737,318 A | 4/1998 | Melnik | |
| 5,944,842 A | 8/1999 | Propp et al. | |
| 5,986,357 A | 11/1999 | Myron et al. | |
| 6,728,319 B1 | 4/2004 | Nystrom et al. | |
| 6,784,790 B1* | 8/2004 | Lester | 375/239 |
| 7,009,348 B2 | 3/2006 | Mogilner et al. | |
| 7,027,483 B2* | 4/2006 | Santhoff et al. | 375/130 |
| 7,032,152 B2* | 4/2006 | Xu | 714/746 |
| 7,042,173 B2 | 5/2006 | Huber | |
| 7,843,145 B2* | 11/2010 | McKenzie et al. | 315/291 |
| 2005/0174067 A1 | 8/2005 | Huber et al. | |
| 2006/0284728 A1 | 12/2006 | Rubinstein et al. | |
| 2007/0018783 A1 | 1/2007 | Erhardt | |
| 2008/0104477 A1 | 5/2008 | Lunelli et al. | |
| 2008/0112491 A1 | 5/2008 | Shaanan et al. | |

\* cited by examiner

*Primary Examiner* — Daniel Wu
*Assistant Examiner* — Mancil Littlejohn
(74) *Attorney, Agent, or Firm* — Waddey & Patterson, P.C.; Mark J. Patterson; Gary L. Montle

(57) ABSTRACT

A system and method is provided for encoding and decoding control signals to an electronic ballast. An encoding circuit is effective to transmit encoded control signals across an AC power line comprising patterns of energy bursts at zero crossings of an AC signal. Eight zero crossings define a set, five specific patterns of energy bursts within a set define distinct symbols, each defined symbol selected such that a Hamming distance between each symbol is greater than three. Four symbols correspond to a first logic condition and one symbol corresponds to a second logic condition. Each received symbol is sequentially associated with a distinct control channel having one or more control parameters. A receiving circuit in the ballast is effective to decode symbols with single-bit error correction by comparing received symbols to defined symbols and determining which symbol is a smallest Hamming distance from a received symbol.

20 Claims, 2 Drawing Sheets

SYSTEM AND METHOD FOR ENCODING BALLAST CONTROL SIGNALS

CROSS-REFERENCES TO RELATED APPLICATIONS

This application claims benefit of the following patent application(s): U.S. Provisional Application No. 61/107,089 filed Oct. 21, 2008.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to providing dimming control signals for a fluorescent ballast. More particularly, this invention pertains to encoding dimming signals for a ballast over a power line to reduce potential unintended dimming effects of noise.

Referring to FIG. 1, a single-burst signaling system 100 is shown as previously known in the art. This system uses a high frequency burst 102 of approximately 9.8 kHz transmitted coincident with the zero crossings 104 of the AC mains 106. The presence or absence of the burst within a group of eight zero crossings 108 (or one frame 108) represents the logical state of each bit 110. In the example shown, a single burst within a group of zero crossings, or set, decodes as "0". No bursts detected within a set decodes as "1". The bits are organized into repeating bit patterns whose one-to-zero density is proportional to the desired dimming level. The repetitive bit patterns are encoded such that ones and zeros are proportionally distributed, allowing larger groups of bits 112 (super-frames 112) to be evaluated anywhere within the repeating pattern.

The single-burst signaling system unfortunately does not adequately accommodate more than one control channel. It is desirable in many modern ballasts to provide, in addition to a dimming level control signals as above, remote capability for sending commissioning messages, tuning control of the maximum and/or minimum light output for a ballast, and daylight harvesting signals to automatically adjust the light output in response to changes in the ambient light level in a particular area. While multiplexing of signals from more than one source along a common communications line is known to those of skill in the art, a single-burst signaling system cannot distinguish between various sources along the line.

Various systems are further known to those of skill in the art for generating and detecting pulses carrying ballast control information over a power line. However, in some of these systems detection of the transmitted pulses is difficult where the pulse width changes in response to changes in the input voltage. Other systems have the disadvantage of causing unintentional lamp dimming in the presence of high levels of power line noise about the control signals transmitted to the ballast.

What is needed, then, is a system for generating and detecting control signals over a power line without being susceptible to unintentional lamp dimming as a result of power line noise.

It is further desirable to provide a system for generating and transmitting control signals from multiple control sources over a common power line to a ballast configured to detect the signals.

BRIEF SUMMARY OF THE INVENTION

A system and method are provided for encoding dimming signals for fluorescent ballasts over a power line. The dimming signal uses repeating bit patterns, with the states of each bit represented by specific 8-bit symbols. Symbols are chosen such that the ballast can perform error correction, thus reducing the effects of noise on the line. Multiple symbols are used to provide simple ballast addressing, allowing ballasts to be placed into zones without requiring changes in existing wiring for a building. Addressing extends existing energy management systems by adding daylight harvesting capability.

In an embodiment of the present invention, an encoding and decoding system is provided for power line transmission of control signals with single bit error correction. An AC power line is arranged to transmit an AC signal which may include high frequency bursts of energy at the zero crossings. The bursts are provided by one or more control sources, and a particular arrangement of energy bursts from each control source defines either a symbol corresponding to a first logic condition for that control source or a symbol corresponding to a second logic condition for that control source. At least a minimum Hamming distance is defined between any two defined symbols. A processing circuit is coupled to the AC power line and arranged to receive the AC signal, decode symbols received within the signal, and detect the logic conditions encoded within each received symbol.

In another embodiment of the present invention, a method is provided for decoding ballast control signals. A first step is receiving at a microprocessor an AC signal transmitted across an AC power line. The AC signal includes a plurality of zero crossings defining a set, and the set has a pattern of energy bursts provided at the zero crossings. A second step is identifying a channel to be associated with the set from among a predetermined sequence of distinct channels. A third step is comparing the received pattern with a plurality of stored patterns defining unique symbols, with each symbol selected in accordance with a minimum Hamming distance between the symbol and each other symbol. A fourth step is determining the symbol associated with the received pattern. A fifth step includes determining a logic condition for the identified channel based on the determined symbol. A sixth step includes applying control signals to the ballast in a predetermined manner associated with the channel and in accordance with the determined logic condition.

In another embodiment of the present invention, an encoding and decoding system is provided. The system includes an AC power line and one or more encoding circuits effective to transmit encoded control signals across the AC power line. The control signals include patterns of energy bursts provided by the encoding circuits at zero crossings of an AC mains signal also transmitted across the AC power line. Eight zero crossings define a set, and a plurality of specific patterns of energy bursts within a set define a plurality of symbols, with each defined symbol selected such that a Hamming distance between any two defined symbols is at least three. One or more of the plurality of symbols correspond to a first logic condition and one or more of said plurality of symbols correspond to a second logic condition. Each set is provided in association with a distinct control channel, with each channel associated with one of the encoding circuits, and also with one or more control parameters. A receiving circuit is provided in association with an electronic dimming ballast. The receiving circuit decodes the control signals with single-bit error correction by comparing the received symbols to the defined symbols and determining the defined symbol having a smallest Hamming distance from the received symbol. The receiving circuit then controls the ballast in accordance with control parameters for the logic condition of the control channel corresponding to the received symbol.

DETAILED DESCRIPTION OF THE INVENTION

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal.

Figure 1:
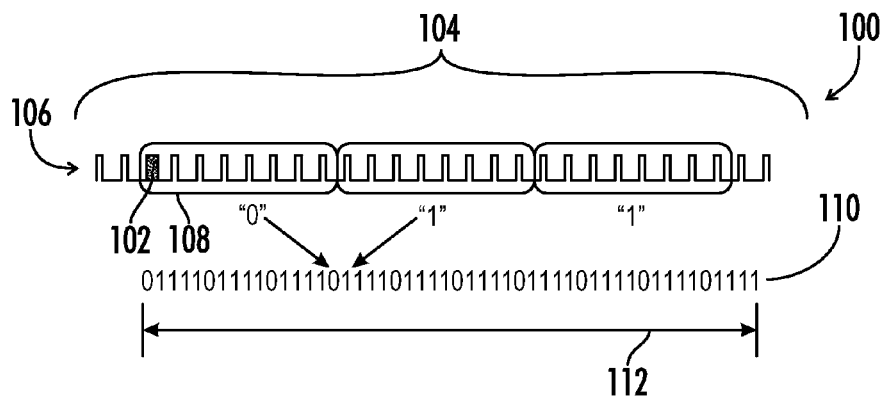
FIG. 1 is a diagram showing a single burst signaling protocol as previously known in the art.
Figure 2:
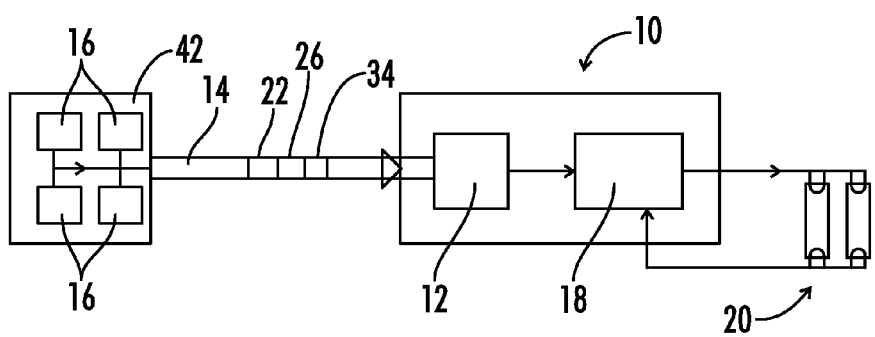
FIG. 2 is a block diagram of an embodiment of an encoding system of the present invention.
Figure 3:
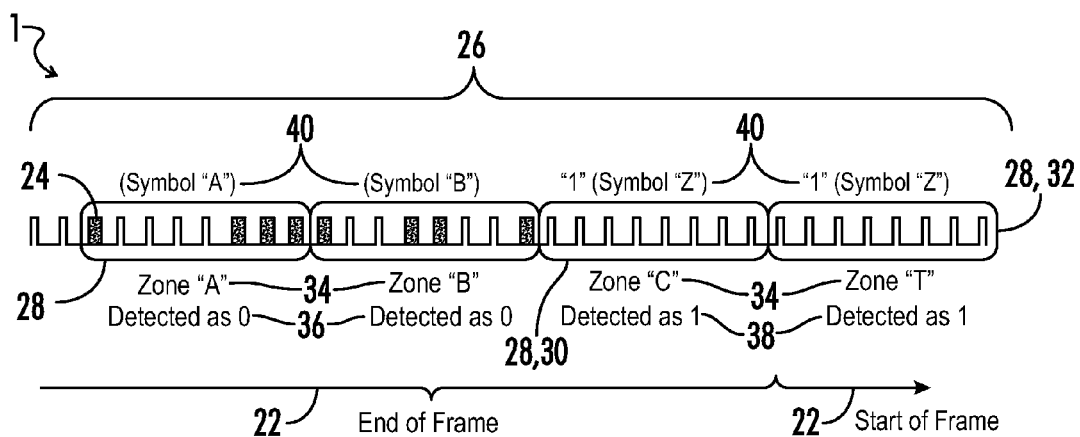
FIG. 3 is a diagram showing a signaling protocol in accordance with various embodiments of the present invention.
Figure 4:
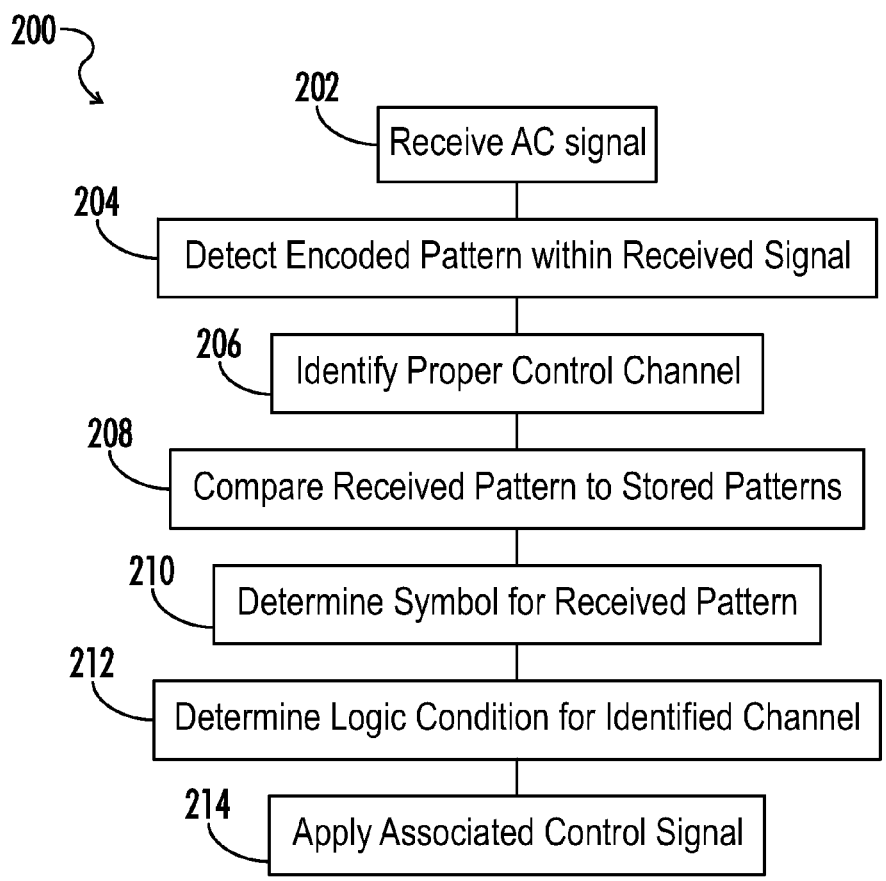
FIG. 4 is a flowchart showing a method of an embodiment of the present invention.

Referring generally to FIGS. 2-4, various embodiments of a system and method for encoding, transmitting and decoding dimming control signals across an AC power line will be herein described. In the embodiments detailed below, the system and method are applied to an electronic ballast for powering and dimming at least one fluorescent lamp, but it may be anticipated that the concepts herein are applicable in various alternative systems as well.

Referring now to FIG. 2, a fluorescent ballast 10 for powering a load 20 is provided with a power line communications signal receiving circuit 12 coupled to an AC mains power line 14. The receiving circuit 12 may be a microprocessor 12 configured as described below to receive AC signals and decode control signals transmitted within the AC signals. The receiving circuit 12 alternatively may include a microprocessor and additional discrete circuitry configured for performing these tasks. The receiving circuit 12 is further coupled to ballast circuitry 18 within the ballast 10 for transmitting decoded control signals as further described below. The ballast circuitry 18 is configured to power the load 20 such as a fluorescent lamp 20 and may generally include an inverter, an inverter driver, and a power factor correction controller. The ballast control circuitry 18 is effective thereby to act in response to control signals and to dim one or more lamps 20. The receiving circuit 12 and the ballast circuitry 18 may be in separate sections on a common printed circuit board, or may be integrally composed with the ballast circuitry 18 in a common integrated circuit (not shown) or may be local but separate from the ballast 10 itself and electronically coupled to the circuitry 18 in question (also not shown).

One or more encoding circuits 16 or control sources 16 are coupled along the AC power line 14. Each of the control sources 16 is configured to provide a control signal to the ballast 10 associated with one or more particular functions. The control sources 16 may generally be incorporated within a common computer system 42 in for example a control tower. The control sources 16 may alternatively be located in various positions along the AC power line 14, as long as the capability remains to combine signals from the various control sources 16 on the power line 14 in a manner readable by the receiving circuit 12.

Referring now to FIGS. 2-3, various embodiments of the present invention substitute the single burst frame of power line communications as previously known in the art with a multiple burst encoding system 1 including a plurality of distinct frames 22 each represented by a series of high frequency energy bursts 24 or pulses 24 provided at zero crossings 26 of the AC mains power signal 28 which is received by the receiving circuit 12. The energy bursts 24 in an embodiment may be 9.6 kHz tone-bursts 24 having a pulse width selected to further facilitate detection of the bursts 24, but may be provided in a number of different configurations as known in the art. Further, detection of bursts provided at zero crossings of the AC mains signal by a signal receiving circuit 12 may be performed in a variety of ways as known in the art and within the scope of the present invention. Each of the one or more control sources 16 provide a series of bursts 24 along a plurality of zero crossings 26 defining a set 28, or data block 28 as commonly known in the art. The individual zero crossings 26 may also be referred to as bits 26, as further commonly known in the art. Each series of bursts 24 is provided in a particular and predetermined pattern defining a symbol 40.

In an embodiment as shown, various sets 28 include an 8-bit pattern of bursts beginning with a single burst 24, followed by a no-burst and then a 6-bit sequence to represent the remainder of the pattern and define a particular symbol 40. A plurality of different symbols 40 (herein four symbols denoted A, B, C and T) may be used to represent a data block 28 with value or logic condition "0" and will have the general format "bNxxxxxx". The letter "b" represents a 9.6 kHz energy burst 24 and each "N" represents the absence of such an energy burst in a bit 26 or zero crossing 26. There is a unique 6-bit pattern "xxxxxx" for each symbol 40 (A, B, C or T).

The symbol 40 for a received data block 28 having logic condition of "1" may be represented in an embodiment as shown by a lack of bursts "NNNNNNNN", and may further be denoted as symbol "Z". The use of the term "pattern" or "arrangement" of bursts 24 within a set 28 may be intended therefore to encompass a set 28 having no bursts 24 at all.

Time division multiplexing may be used to incorporate sets 28 from each of the one or more control sources 16 that are transmitting encoded control signals into a sequential transmission along the AC power line 14. The transmission is divided into recurring frames 22 of a predetermined length, each frame 22 including one set 28 from each control source 16. After a frame 22 has concluded with the last set 28, 30 in a sequence, the transmission picks up with a first set 28, 32 from a first control source 16 and begins transmitting another frame 22 in the same sequence.

In an embodiment as shown in FIG. 3, time division multiplexing may be used to create a 32-bit frame of four channels 34 having eight bits 26 or zero crossings 26 apiece. Each channel 34 represents an individual control source 16 and is further associated with a particular symbol 40 which will indicate the desired control signals for that particular control source 16. Stated differently, a particular symbol 40 for each control channel 34 may be provided to represent a first logic condition 36 associated with instructions to carry out a specified control function, and a different symbol may be provided to represent a second logic condition 38 associated with instructions to ignore the specified control function for that control channel 34.

As multiple frames 22 are received and decoded, the arrangement of sequential logic conditions 36, 38 associated with a particular control channel 34 may be analyzed to detect a control signal with greater precision. For example, a particular arrangement of "0" and "1" logic conditions 36, 38 provided over a predetermined number of frames 22 decoded with respect to a first control channel 34 may be programmed to indicate a particular control response. In alternative control channels 34, each received logic condition 36, 38 may individually indicate a control adjustment for a particular parameter. The present invention therefore anticipates various systems and methods for encoding and decoding control signals of varying complexity.

In the embodiment shown, the first symbol 40 is used to transmit commissioning messages and for ballast tuning. The second symbol 40 is used for the primary dimming channel. The third and fourth symbols 40 are used for daylight harvesting dimming channels. Each dimming channel 34 may be controlled independently. In this manner the use of multiple independent channels A, B, C, T transmitted to a ballast 10 along a common power line 14 allows the ballast 10 to be placed into particular zones without the need to change existing building wiring. It may be understood that various alternative uses, control channels and associated symbols are within the scope of the present invention.

Symbols 40 used for each control channel 34 are unique and in various embodiments are preferably chosen such that a Hamming distance between any two symbols 40 is greater than or equal to three. This allows single bit errors to be well tolerated.

Referring now to the Tables A and B below, single-bit error correction with Hamming distances greater than or equal to three requires six data bits 26 for the signal pattern and two data bits 26 for the starting sequence, for a total of eight bits 26 to be transmitted. 32:1 multiplexing as known in the art is used, which allows for four separate zones 34 or control channels 34, including three dimming channels and a commissioning or tuning channel. Table A represents codes associated with various symbols 40 in an embodiment as shown in FIG. 3:

TABLE A

| Symbol | Decimal (hex) | Binary | Hex Code | Decimal |
|---|---|---|---|---|
| A | 14 (0x0E) | 10001110 | 0x8E | 142 |
| B | 19 (0x13) | 10010011 | 0x93 | 147 |
| C | 52 (0x34) | 10110100 | 0xB4 | 180 |
| T | 41 (0x29) | 10101001 | 0xA9 | 169 |

Table B represents Hamming distances between the various symbols in an embodiment as shown in FIG. 3:

TABLE B

| Symbol | A | B | C | T | Z |
|---|---|---|---|---|---|
| A | 0 | 4 | 4 | 4 | 4 |
| B | 4 | 0 | 4 | 4 | 4 |
| C | 4 | 4 | 0 | 4 | 4 |
| T | 4 | 4 | 4 | 0 | 4 |
| Z | 4 | 4 | 4 | 4 | 0 |

Receiving circuit 12 is arranged to receive the AC signal across the AC power line 12 and decode the provided control signals. In various embodiments of the present invention, decoding the control signals includes determining which of the plurality of defined symbols (for example: A, B, C, T or Z) is most likely to have been indicated by a received symbol transmitted across the AC power line. Noise on the line can corrupt the transmitted signal, so the received symbol may not be identical to any of the defined symbols.

The Hamming distance between the received symbol "x" and each of the defined symbols may be used to determine the symbol that was most likely to have been encoded and transmitted. The Hamming distance between two symbols of equal length is defined as the number of positions for which the corresponding symbols are different, as is generally known in the art. The notation $d(x, A)$ may be used to denote the Hamming distance between received symbol "x" and defined symbol "A". In various embodiments of the present invention, decoding control signals from the transmitted symbol therefore include computing metrics for each of the defined symbols with respect to the received symbol and choosing the smallest Hamming distance, corresponding to the most likely symbol that was sent. With regards to the embodiment as shown in FIG. 3, the applicable metrics for computation would be: $d(x, Z); d(x, A); d(x, B); d(x, C); d(x, T)$.

In various embodiments of the present invention, the receiving circuit 12 may buffer a fixed number of symbols to decode the control signals. The receiving circuit 12 may for example be arranged to buffer one hundred symbols, in which case the control signals are decoded to a resolution of one percent. As each new control signal is received, the oldest symbol is accordingly discarded. For a typical line frequency of 60 Hz, the receiving circuit buffer requires 26.7 seconds to completely clear a symbol from the buffer. The relatively slow transition creates an inherent low pass filter, and accordingly single symbol errors cannot have an instant and substantial effect on light dimming levels.

The receiving circuit 12 may further be programmed to respond to one or more of the dimming symbols and the commissioning/tuning symbol. In various embodiments such as shown in FIG. 2 where the present invention is used in an electronic ballast, the receiving circuit 12 may be a microprocessor 12 that for example applies control signals directly to an inverter driver and dims a fluorescent lamp in accordance with the received control signals.

The potential improvements due to using an 8-bit Hamming symbol rather than a single-bit symbol can be quantified, as shown by referring to the following Table C illustrating probability of single-bit error (q), probability of single-bit error after Hamming corrections (Qh) when using 8-bit symbols, and the Improvement Ratio (q/Qh):

TABLE C

| q | p = (1 − q) | P0 | P1 | Qh | q/Qh |
|---|---|---|---|---|---|
| 0.1 | 0.9 | 0.4305 | 0.38624 | 0.186895270 | 0.54 |
| 0.01 | 0.99 | 0.9227 | 0.07457 | 0.002690078 | 3.72 |

TABLE C-continued

| q | p = (1 − q) | P0 | P1 | Qh | q/Qh |
|---|---|---|---|---|---|
| 0.001 | 0.999 | 0.9920 | 0.00794 | 0.000027888 | 35.86 |
| 0.0001 | 0.9999 | 0.9992 | 0.00080 | 0.000000280 | 357.29 |
| 0.00001 | 0.99999 | 0.9999 | 0.00008 | 0.000000003 | 3571.57 | where:

q=the probability of single-bit error;

p=1−q=the probability of correct symbol being received;

P0=the probability of receiving an 8-bit symbol with no (0) errors, computed using binomial distribution;

P1=the probability of receiving an 8-bit symbol with single-bit (1) error, computed using binomial distribution (this error can be corrected using Hamming distance);

P0+P1=the probability of receiving a correctable symbol;

Qh=the probability of receiving an incorrect symbol with Hamming corrections used, or stated otherwise the probability of uncorrectable error;

q/Qh=the improvement ratio using Hamming corrections over receiving a single-bit symbol.

As may be seen, single-bit error correction is quite effective and becomes even more effective as the bit rate error decreases. This can be explained because the probability of double-bit errors varies as (q)*(q) which decreases exponentially. Correction of more than single-bit errors is generally not required.

Referring now to the block diagram of FIG. 4, a method 200 of decoding ballast control signals in accordance with an embodiment of the present invention may be herein described. The method begins in block 202 by receiving at a microprocessor an AC signal transmitted across an AC power line. The microprocessor is preferably integrally part of or otherwise operatively linked to the ballast to be controlled. The AC signal includes a plurality of zero crossings defining a set, with the set further including a pattern of high frequency energy bursts provided at the plurality of zero crossings. The pattern may include various arrangements of actual high frequency energy bursts, or may include no energy bursts at all within the set. The microprocessor and/or associated discrete circuitry are configured to detect in block 204 each burst and determine the encoded pattern provided in a manner known to those of skill in the art.

In block 206 the method continues by identifying a control channel associated with the set. The sets are provided in a given sequence across the AC power line in various embodiments by Time Division Multiplexing of signals provided from various control sources. The microprocessor identifies the channel associated with the set from among the given sequence such that the encoded signal can be related to the appropriate control function.

In block 208 the method continues by comparing the received pattern with a plurality of stored patterns defining unique symbols. Each symbol has been selected and programmed in accordance with a minimum Hamming distance between the symbol and each other symbol. The microprocessor may then in block 210 detect the unique symbol having a defined pattern with the lowest Hamming distance from the received pattern, thereby determining the symbol associated with the received pattern using single bit correction and substantially avoiding issues that typically accompany high power line noise.

In block 212 the method includes determining a logic condition for the identified channel based on the determined symbol. Each symbol is associated with either of a first logic condition or a second logic condition, also stated as a "0" or a "1" logic condition. In certain embodiments each channel has a unique symbol associated with a first logic condition for that channel, and each channel has a common symbol associated with a second logic condition. Each channel also has an associated control function, with the first and second logic conditions further associated with a control signal to be applied in association with the control function.

In block 214 the method concludes by applying the control signals to the ballast in a predetermined manner associated with the channel and in accordance with the determined logic condition. In one example, the control signals may include a daylight harvesting dimming signal to be applied to the ballast in a manner known to those of skill in the art. The control signals in various embodiments may be applied incrementally over a series of logic conditions provided for the identified channel. The step of applying control signals in such an embodiment may include buffering a predetermined number of sets to incorporate a wider range of input signals into analysis of an encoded control function, and without requiring an inordinate amount of memory space.

Thus, although there have been described particular embodiments of the present invention of a new and useful System and Method for Encoding Ballast Control Signals, it is not intended that such references be construed as limitations upon the scope of this invention except as set forth in the following claims.

What is claimed is:

1. An encoding and decoding system for power line transmission of control signals, said system comprising:

an AC power line arranged to transmit an AC signal, said AC signal further comprising high frequency bursts of energy at zero crossings of said signal, said bursts provided by at least one control source, a particular arrangement of energy bursts from each control source defining either of a symbol corresponding to a first logic condition or a symbol corresponding to a second logic condition, at least a minimum Hamming distance defined between any two defined symbols; and a processing circuit coupled to said AC power line and arranged to receive said AC signal, decode received symbols associated with said AC signal, and detect said first or second logic condition corresponding to each said received symbol.

2. The system of claim 1, wherein arrangements of energy bursts from each of said at least one control source are collected in sequence to define a frame, and wherein each frame received by said processing circuit further comprises a control channel uniquely associated with each control source.

3. The system of claim 2, said frames transmitted in sequence in the AC signal using time-division multiplexing.

4. The system of claim 2, said processing circuit further arranged to detect said first or second logic condition as associated with each said received symbol by determining a defined symbol having a smallest Hamming distance in relation to each received symbol associated with each said channel.

5. The system of claim 4, each of said at least one channel corresponding to a different control signal.

6. The system of claim 5, said processing circuit arranged to respond to said control signals, said response further comprising controlling an electronic lamp ballast.

7. The system of claim 6, wherein said response to said control signals is dependent upon said detected first or second logic condition.

8. The system of claim 6, wherein said response to said control signals is dependent upon a sequence of first or second logic conditions decoded from a predetermined number of received frames.

9. The system of claim 1, each control source having a unique symbol corresponding to a first logic condition for said control source.

10. The system of claim 1, each control source having a common symbol corresponding to a second logic condition.

11. The system of claim 1, said processing system further arranged to buffer a predetermined number of said received symbols.

12. A method of decoding ballast control signals, the method comprising:
receiving at a microprocessor an AC signal transmitted across an AC power line, the AC signal comprising a plurality of zero crossings defining a set, the set further comprising a pattern of energy bursts provided at the plurality of zero crossings;
identifying a channel associated with the set from among a predetermined sequence of distinct channels;
comparing the received pattern with a plurality of stored patterns defining unique symbols, each symbol selected in accordance with a minimum Hamming distance between the symbol and each other symbol;
determining the symbol associated with the received pattern;
determining a logic condition for the identified channel based on the determined symbol; and
applying control signals to the ballast in a predetermined manner associated with the channel and in accordance with the determined logic condition.

13. The method of claim 12, each symbol selected wherein a minimum Hamming distance of three is defined between each defined symbol.

14. The method of claim 13, wherein the step of determining the symbol associated with the received pattern further comprises determining a Hamming distance between the received pattern and each defined symbol and identifying the defined symbol having the smallest Hamming distance with respect to the received pattern.

15. The method of claim 12, wherein the step of determining a logic condition for the identified channel further comprises determining either of a first or a second logic condition for the identified channel, the first logic condition associated with a positive control signal associated with the channel.

16. The method of claim 15, wherein the step of applying control signals to the ballast in a predetermined manner associated with the channel and in accordance with the determined logic condition further comprises buffering a plurality of sets to determine a control signal provided over the plurality of sets in accordance with a pattern of logic conditions associated with the channel.

17. A power line communication system for an electronic dimming ballast comprising:
an AC power line;
at least one encoding circuit effective to transmit encoded control signals across the AC power line, said control signals comprising patterns of energy bursts provided by said encoding circuits at zero crossings of an AC mains signal further transmitted across said AC power line, wherein
a predetermined number of zero crossings define a set,
a plurality of specific patterns of energy bursts within a set define a plurality of symbols, each defined symbol selected such that a Hamming distance between any two defined symbols is at least three,
at least one of said plurality of symbols corresponds to a first logic condition and at least one of said plurality of symbols corresponds to a second logic condition, and
each set is provided in association with a control channel from among a predetermined sequence of control channels, each channel associated with one of said one or more encoding circuits, and each channel further associated with one or more control parameters; and
a signal receiving circuit in said electronic dimming ballast, said receiving circuit effective to
decode said control signals with single-bit error correction by comparing said received symbols to said defined symbols and identifying a defined symbol having a smallest Hamming distance from said received symbol,
determine said logic condition corresponding to said identified symbol,
apply control parameters to said ballast associated with said logic condition for said control channel.

18. The system of claim 17, said control signals from each encoding circuit configured in a predetermined sequence across said power line.

19. The system of claim 18, said receiving circuit further effective to buffer said logic conditions for said control channel over a predetermined number of control signals, and to apply control parameters in association with a pattern of logic conditions.

20. The system of claim 19, each of said at least one symbol corresponding to said first logic condition comprising a first zero crossing having an energy burst, a second zero crossing lacking a burst, and a subsequent unique sequence of zero crossings defining said symbol.

* * * * *